United States Patent [19]

Vaqueiro et al.

[11] Patent Number: 4,594,260
[45] Date of Patent: Jun. 10, 1986

[54] PROCESS FOR PRODUCING NIXTAMALIZED CORN FLOUR

[75] Inventors: M. Cristina Vaqueiro; Pedro Reyes, both of Mexico City, Mexico

[73] Assignee: Imit, A.C., Mexico

[21] Appl. No.: 652,927

[22] Filed: Sep. 21, 1984

[51] Int. Cl.⁴ .............................................. A23L 1/10
[52] U.S. Cl. .................................. 426/622; 426/463; 426/626
[58] Field of Search ............... 426/463, 331, 622, 626, 426/549, 482; 241/6, 7, 8

[56] References Cited

U.S. PATENT DOCUMENTS 3,194,664 7/1965 Eytinge ............................... 426/626
4,329,371 5/1982 Hart ..................................... 426/463

Primary Examiner—George Yeung
Attorney, Agent, or Firm—Sughrue, Mion, Zinn, Macpeak, and Seas

[57] ABSTRACT

Unnecessary loss of valuable fiber and unnecessary consumption of energy, as well as undue gelatinization of starch contained in the endosperm are avoided by subjecting the whole corn kernels to a selective nixtamalization process which comprises separating the hull from the kernels for forming a hull fraction and an endosperm-germ fraction, subjecting only the hull fraction to nixtamalization such as by heating in an alkaline solution and then mixing the nixtamalized hull fraction with the untreated endosperm-germ fraction.

This mixture is suitable for producing a good quality corn flour suitable for producing tortillas having excellent rheological properties.

13 Claims, 1 Drawing Figure

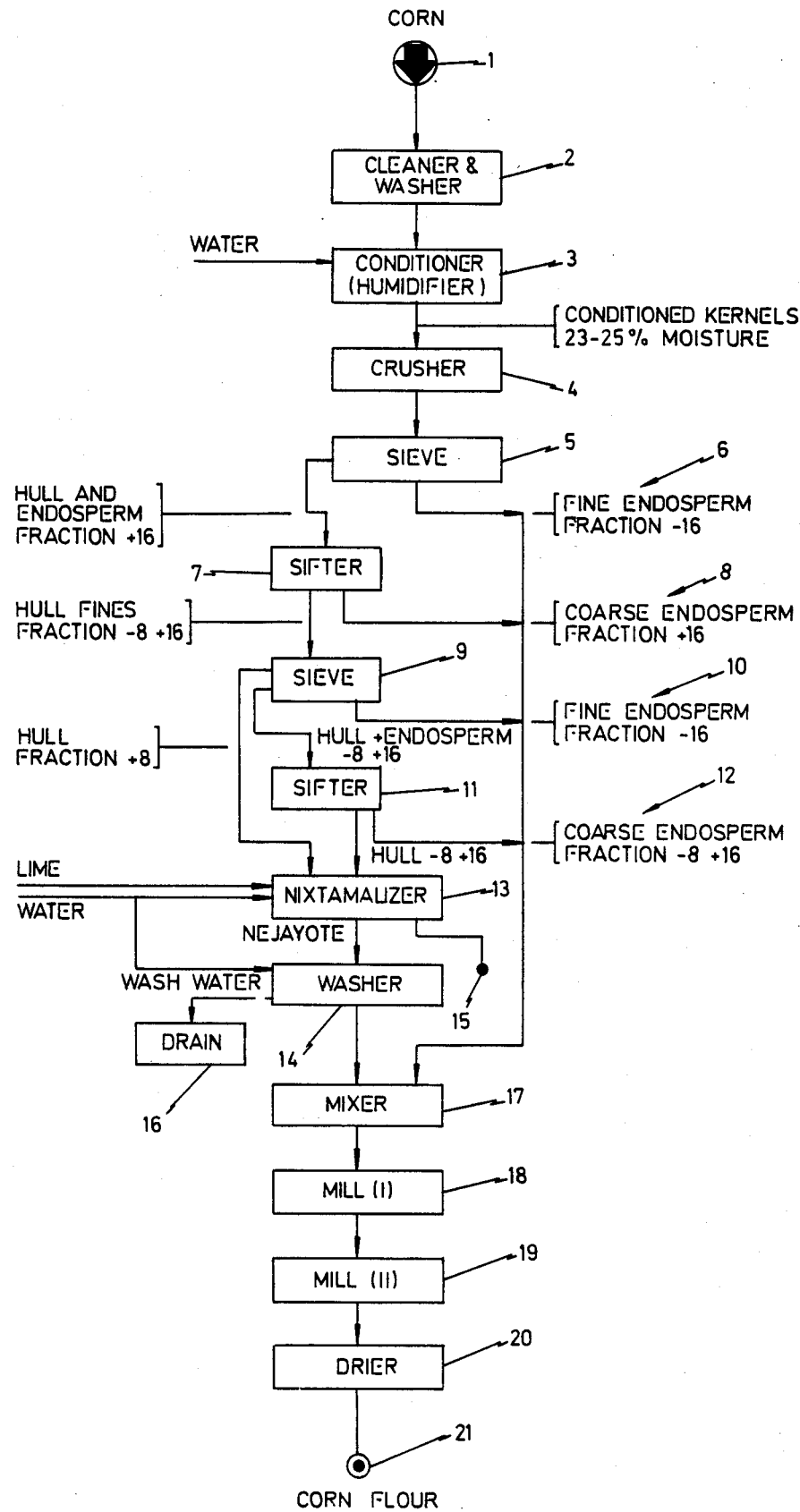

PROCESS FOR PRODUCING NIXTAMALIZED CORN FLOUR

FIELD OF THE INVENTION

The present invention refers to a nixtamalization process for corn kernels and, more particularly, it is related to the production of tortilla corn flour which includes this novel process of nixtamalization.

BACKGROUND OF THE INVENTION

The process of nixtamalization of corn kernels in order to obtain corn dough for the production of tortillas and other articles has long been known. This traditional nixtamalization process comprises admixing one part of whole corn kernels with two parts of an alkaline solution, generally an aqueous 2% by weight lime solution, and then cooking or boiling the mixture, thereafter permitting the cooked product to steep or soak for a period of from 12 to 14 hours, after which the nixtamalized kernels are subjected to a draining operation in order to remove the cooking liquor ("nejayote"). The kernels are then washed with water several times to remove any solubilized products and the excess of lime, and the cooked and nixtamalized kernels (nixtamal) are ground in disk mills, with the addition of small amounts of water, in order to obtain a dough suitable for the manufacture of tortillas. Tortillas are obtained from this dough by forming thin disks of the dough having a diameter of from 12 to 15 cm. and subjecting said disks to a final cooking operation on metal or ceramic plates for periods of about 1 minute divided into 15 seconds, 30 seconds and 15 seconds on alternate sides, at temperatures of from 180° to 200° C. on the surface of the plates.

In view of the ever growing importance of the market for food products derived from tortilla masa dough (nixtamalized corn dough), which is illustrated by the fact that, for instance, during the year 1980, the consumption per capita of tortillas in Mexico was of about 70 kg., various efforts have been made in order to improve the traditional nixtamalization process. All the variations accomplished, however, merely refer to the ratio of water to corn, lime concentration, temperature and time of cooking, washing steps and the like, as illustrated in the following Table 1, but without however affecting in any respect the traditional characteristics of the nixtamalization process described above.

solution of calcium hydroxide in water, and by using a steam pressure ranging from about 5 to 25 pounds per square inch during a period of time of from about 40 to 5 minutes. This process obviously accelerates the nixtamalization process considerably, but at the expense of affecting the flavor and other properties of the masa dough, and produces a masa dough which is not suitable for the manufacture of tortillas but which is rather used for the manufacture of crunchy flakes.

In U.S. Pat. No. 4,250,802, a different process is also reported, which includes preheating of the kernels previously treated with a lime water spray to deliver partially cooked grain in a comparatively dry state to a mill for pulverization thereof, following which it is made into a dough which is finally cooled and formed into the desired end product such as tortillas or corn flakes.

As it may be seen from the above, all the prior art processes for the production of corn dough are based on the treatment of the whole corn kernel with an alkaline solution which are mere variations of the traditional process of nixtamalization described above.

It is a well known fact however, that both the masa dough manufactured from nixtamalized corn kernels and the tortillas manufactured therefrom are quite unstable and have a relatively short shelf life, whereby in countries where the consumption of tortilla is relatively high like in Mexico, wherein the consumption per capita is of about 70 kgs per year, a relatively large amount of nixtamal mills and tortilla manufacturing shops must be installed, such that the tortilla manufacturing shops may obtain on a daily basis the masa dough from the nixtamal mills, to manufacture tortillas to be sold on the same day to the final consumers, who in turn prefer to buy tortillas on a daily basis, in order to avoid hardening of the product. For instance, in Mexico there are approximately 25000 nixtamal mills and 23000 tortilla manufacturing shops to satisfy the needs of the Mexican market.

Considering the above, the workers of the prior art led their efforts in two different directions, one of which was to improve the stability of the end products, namely, the tortillas and one other alternative, namely, to produce a dried corn flour which might have a long shelf life and other advantages.

The first alternative is represented by the process of Manuel Jesus Rubio et al, U.S. Pat. No. 3,730,732, which reports that the yield of dough and tortillas is increased by incorporating water soluble alkaline sub-

TABLE 1

| | | | CONDITIONS OF NIXTAMALIZATION | | | | |
|---|---|---|---|---|---|---|---|
| Corn | Water | CaO | Temperature | Cooking time | Steeping time | | |
| (Parts by Weight) | | | (°C.) | (min) | (hours) | Washings | |
| 1 | 2 | 0.02 | 80 | 20–45 | 14 | 2–3 | Illescas, R. (1943) |
| 1 | 1.2 | 0.05 | 94 | 50 | 14 | 3 | Bressani, R. (1958) |
| 1 | 2 | 0.02 | 92 | 0 | 12 | — | Vaqueiro C. (1969) |
| 1* | 2 | 0.02 | 87–90 | 50 | 0 | — | Vaqueiro C. (1969) |
| 1 | 2 | 0.01 | boiling | 0 | 12–15 | 2 | FAO, 1979[1] |
| 1* | 2 | 0.01 | 76 | 100 | 0 | 2 | FAO, 1979 |
| 1 | 3 | 0.01 | boiling | 20 | 15 | — | Bazua, C. A. (1979) |
| 1 | Supersaturated lime | | 70–110 (pressure) | 0.6–5 | 0.5–2 | 0 | U.S. Pat. No. 3,083,103 |
| 1 | 3 | 0.01 | — | — | — | — | Bedolla, S. (1982) |

*Accelerated nixtamalization
[1]Examination of Processes and Products originated from Corn Flour, 1979 FAO, IMIT.

For instance, in U.S. Pat. No. 3,083,103 to Anderson et al, a process for the obtention of corn masa dough is described, wherein the step of processing the corn kernels is carried out in the presence of a supersaturated stances in the dough. Also, Rubio et al report that this process of adding soluble alkaline substances to the dough, retards the microbiological spoilage of tortillas which are unleavened, unshortened food products made of nixtamalized corn or nixtamalized corn flour. This type of processes for improving the shelf life of tortillas, do not solve the problem of having a product for the manufacture of tortillas that may be preserved for relatively long times without any spoilage, since the only improvement is in the end product, namely, the tortillas, which nevertheless tend to become hard and brittle, regardless of the fact that they may or may not be affected by microbiological spoiling processes.

Therefore, the most universally accepted technology has been the second above mentioned alternative, namely, the production of corn flour, more particularly of nixtamalized corn flour which may serve as an instant product for the manufacture of tortillas and other corn products, even after being stored for relatively long times without any spoilage. The nixtamalized corn flour presents a number of advantages with respect to the dough produced by the traditional method described above, such as the following ones: (a) the corn flour may be stored at room temperature for relatively long periods of time; (b) the production and distribution may be adjusted to the demand; (c) the product is highly homogeneous; (d) the hygienic conditions during the manufacture of corn flour are much better and are controlled in a strictly regulated manner than those prevailing in the manufacturae of masa dough; (e) if the end products such as tortillas or other corn products such as corn flakes are to be used as carriers for some other nutrients, these nutrients may be easily incorporated in the corn flour.

Numerous slightly different methods for the manufacture of nixtamalized corn flour have been reported in the literature, but the method which has gained more popularity and which is and has been up to the present time the most widely utilized one on an industrial level, is the process of accelerted nixtamalization developed by the Mexican Institute of Technological Research (IMIT) (Instituto Mexicano de Investigaciones Tecnologicas) back in the year of 1951 (U.S. Pat. No. 2,584,893). This process comprises an accelerated nixtamalization of the whole corn kernels for a period of time of from 45 to 60 minutes at a temperature in the vicinity of the boiling point, with a weight ratio of corn to water of 1:2 and a calcium hydroxide concentration of 1% based on the amount of corn. The whole corn kernel nixtamalized by the above process and having a moisture of from 40 to 45% is drained and washed, after which the nixtamalized kernel is subjected to impact milling and is dried for obtaining a dried corn flour.

E. L. Wimmer et al, U.S. Pat. No. 3,404,986, patented Oct. 8, 1968, report a method of manufacturing a corn flour having a rich whole corn flavor as distinguished from the flavour which results from lime treatment, which essentially comprises the control of the moisture content of a previously prepared corn meal for partially gelatinizing the moistened meal between closely adjusted heated rotating rolls to form flakes which are thereafter ground to obtain the corn flour. This process, however, by not using the nixtamalization step, namely, the treatment with an alkaline solution, may be regarded as a process which is inadequate for the preparation of a masa dough for the manufacture of soft and tender tortillas, since the fiber of the hull of the whole corn kernels is preserved without any transformation, which may give rise to an unsuitable plasticity in the masa dough for forming the disks that are called tortillas.

Fausto Celorio, Mexican patent No. 125,285, of Apr. 25, 1972, describes a different process and apparatus for the obtention of nixtamalized corn flour by using a dry process, which essentially comprises admixing a previously prepared corn meal with an appropriate amount of lime and heating the mixture in a chamber in a fluid bed, so as to release moisture from the particles of the corn meal, such that a humid and hot atmosphere is formed within the nixtamalization chamber, sufficient for effecting nixtamalization of the corn meal without the addition of an aqueous medium. This process, however, may be regarded as producing poor results in view of the fact that the admixture of the corn meal and the lime in a powdered state, produces lack of homogeneity in the nixtamalization process, with the consequent difficulties in quality control of the corn flour obtained by said process.

One other process for the obtention of corn flour for the manufacture of tortillas is that proposed by Molina et al, Journal of Food Science, Volume 42, No. 6 (1977), page 1432 et seq, which comprises milling the whole corn kernel and admixing the corn meal thus obtained with a 0.3% lime solution in a weight proportion of 3 to 1. The moist mixture is dried in a drum dryer and the product is thereafter ground for obtaining an instant corn flour for making tortillas. This process, however, does not introduce any advance in the art and, instead, requires a cumbersome drying procedure which is of relatively difficult control. Besides, the nixtamalization of preground material cannot be controlled appropriately.

Bazua et al, Journal of Food Science, Volume 44 (1979), page 940 et seq, describe a process for the manufacture of nixtamalized corn flour which comprises milling the whole corn kernel, adding to the thus obtained corn meal 0.2% by weight of calcium hydroxide and subjecting the product to extrusion with the addition of water. The product resulting from this operation is a moist flour which is subjected to drying and grinding for the obtention of an instant flour for making tortillas.

As it may be seen from the above, all of the processes either for obtaining masa dough or for obtaining instant flour for making tortillas and the like, have resource to nixtamalization of the whole corn kernel, and particularly introduce the concept of an accelerated nixtamalization treatment, which produces a plurality of physical and chemical changes that bring as a consequence loss of solids and changes in the constituents inherent to the corn kernel. It has been reported that the loss of solids reaches values of from 5 to 14%, mainly caused by solubilization due to the thermal treatment in an alkaline liquour. The components which are lost with more frequency are, the 33 to 40% of the fats present in the germ, the 32 to 46% of the raw fiber of the hull, and the 10% of the nitrogen of the proteins contained by the corn kernel.

At the same time, the nutrient value of the corn is affected, mainly due to the insolubilization of certain proteins, the release of certain amino acids and the modification of the leucine/isoleucine ratio and the increase in the availability of niacin.

The changes produced in the hemicellulose are connected with the hydrolysis and solubilization, which releases highly hydrated cellulose fibriles having a high effect in the rheologic and mechanical characteristics of the dough and the tortillas. These changes are more drastic in the traditional nixtamalization than in the accelerated nixtamalization treatment, and the type of grinding which is used in both processes exerts a different effect on the hull, inasmuch as in the instance of the traditional nixtamalization described above, the grinding by attrition with stone disks forms fibriles, while in the accelerated process the grinding is an impact grinding and a shear grinding, which generates the formation of fibers joined in an irregular staple form, and has a marked effect on the characteristics of the dough and the tortillas in what refers to parameters such as penetration, elasticity, plasticity, resistance to bending, and the like.

In connection with the proteins, these suffer an initial solubilization process which permits migration thereof towards the cooking liquor, although thereafter said proteins are insolubilized by the action of the temperature within the cells. This phenomenom is extant both in the traditional nixtamalization and in the accelerated nixtamalization.

The starch, on the other hand, in the instance of the traditional nixtamalization, is merely homogeneously hydrated permitting the release of the starch granules during grinding, whereby said starch is obtained in a very fine type of particles and, at the same time, in view of the type of thermal treatment and grinding under humid conditions, no damage through gelatinization or through mechanical action is produced. In the instance of the accelerated nixtamalization, the peripheral zone of the endosperm presents gelatinization of the starch and, while this might permit an increase in the absorption of water during preparation of the dough, it also facilitates the evaporation of water during cooking of tortillas, whereby the mechanical properties of said products are detereously affected. It is to be noted that during the cooking of the tortilla a total gelatinization of the starch granules is produced.

BRIEF SUMMARY OF THE INVENTION

Having in mind the defects of the prior art methods, it is an object of the present invention to provide a process for producing nixtamalized corn flour, which will prevent excessive loss of fiber from the corn kernels, as well as excessive gelatinization of the starch of the endosperm.

It is one other object of the present invention to provide a process of the above mentioned character, which by very simple means will produce a corn flour suitable for the manufacture of tortillas with extremely good folding properties and with the preservation of the characteristic flavor of the tortillas made by the traditional nixtamalization process.

It is one further object to the present invention to provide a process for producing nixtamalized corn flour, which will require relatively lower amounts of calcium hydroxide for the nixtamalization step without however impairing the nixtamalization characteristics of the whole corn kernel.

It is one other object to the present invention to provide a process for producing nixtamalized corn flour, of the above mentioned character, which will only cause partial changes in the kernel structure and will permit the obtention of a corn flour from which a dough may be produced which is entirely similar in characteristics to the dough obtained by the traditional nixtamalization process.

One other and more specific object to the present invention is to provide a process for producing nixtamalized corn flour, of the above mentioned character, which will have resource to a fractionated nixtamalization process, in order to avoid undue treatment of certain fractions of the corn and which will therefore preserve the characteristics of a corn flour produced by a non accelerated nixtamalization process.

The foregoing objects and others ancillary thereto are preferably accomplished as follows:

According to a preferred embodiment of the present invention, a highly improved nixtamalized corn flour is obtained by subjecting the whole corn kernels to a process comprising the steps of: cleaning the whole corn kernels; conditioning the cleaned kernels by boiling in an aqueous liquour for a relatively short period of time, sufficient to soften the hulls and to partially hydrate the starch contained in the endosperm; crushing the conditioned kernels to form a particulate corn material; classifying the particles to produce a hull fraction isolated from the endosperm/germ fraction; subjecting only the said hull fraction to a nixtamalization step by heating said hull fraction suspended in an aqueous alkaline solution; draining the spent alkaline liquor; washing the nixtamalized hull fraction; mixing said hull fraction with the untreated endosperm-germ fraction; grinding the mixture and drying the ground mixture, which in this particular instance, has a relatively low moisture content to obtain a nixtamalized corn flour.

BRIEF DESCRIPTION OF THE DRAWINGS

The novel features that are considered characteristic of the present invention are set forth with particularity in the appended claims. The invention itself, however, both as to its organization and its method of operation, together with additional objects and advantages thereof, will best be understood from the following description of a specific embodiment when read in connection with the accompanying drawing, in which:

The single FIGURE is a block-type flow sheet illustrating the process for the obtention of nixtamalized corn flour in accordance with the present invention.

DETAILED DESCRIPTION

Through numerous experimental runs and tests it has been determined that one of the main factors which causes brittleness of the tortillas manufactured from corn flour is the accelerated nixtamalization process to which the whole corn kernels are subjected in all the processes extant in the prior art for the manufacture of nixtamalized corn flour by the treatment of whole corn kernels.

In effect, the traditional nixtamalization process which produces masa dough from which tortillas with a very good softness and flexibility and plasticity characteristic are obtained, does not produce undue gelatinization of the starch contained in the endosperm of the corn kernels or destruction or solubilization of the fats contained in the germ of the corn kernels, but rather the long time steeping process to which the corn kernels are subjected after the alkaline treatment, is responsible for a highly homogeneous hydration of the said starch which is preserved in the dough in the hydrated form and is thereafter gelatinized when the tortillas are formed and cooked, therefore preserving a high water content which is responsible for the softness, flexibility and plasticity characteristics of the tortillas obtained from said masa dough produced by the traditional nixtamalization process. Contrary to the above, in all processes of the prior art for producing nixtamalized corn flour, an accelerated nixtamalization process is used, which process is carried out by using the whole corn kernels, without any useful purpose whatsoever and with relatively higher energy consumption, because it has been found that, even with said accelerated nixtamalization process, under the force condition used in the traditional nixtamalization process, the alkaline solution is unable to permeate the hull of the grain, which means that a large proportion of the grain weight is being handled without receiving any actual treatment whatsoever, but nevertheless with the consequence that the endosperm is being unnecessarily and disadvantageously heated, which may give rise to the formation of certain amounts of gelatinized starch.

This gelatinized starch, when the mass dough is pressed into the disks for forming the tortillas, may cause certain problems by rendering the dough somewhat difficult to form, whereby the finished product may not have good foldable characteristics which is one of the primary characteristics for a good quality tortilla food.

Also, as mentioned above, the accelerated nixtamalization process produces loss of fiber, which is a highly desirable element to be contained in the masa dough produced from the corn flour to be thereafter transformed into the end products such as tortillas and the like.

On the other hand, as also mentioned above, through numerous experiments it has been also determined that the accelerated nixtamalization process does not permit permeation of the alkaline solution through the hull of the kernels and into the endosperm thereof, whereby it does not affect said endosperm. Therefore, while it has been possible to obtain corn flour having characteristics that may be acceptable to produce tortillas and the like, this has entailed the handling of excess weight of materials and the possible advanced gelatinization of starch, which renders the quality of the products rather difficult to be controlled.

In view of the above, it has now been determined that the nixtamalization of the endosperm of the kernels is not only unnecessary but undesirable, contrary to what was the opinion in the prior art that the whole kernel should be nixtamalized, whereby in accordance with the present invention, a novel process has been deviced, in which, previous to the nixtamalization step, the hull fraction is isolated from the remaining fractions of the corn kernel, and said hull fraction is the only one which is subjected to the nixtamalization step, whereas the other fractions are only subjected to a hydration step which is the ideal condition for the starch and fats contained therein.

Therefore, based on the behavior of the different structures of the corn kernel during the traditional nixtamalization as compared to the accelerated nixtamalization, a new process was developed to cause partial changes in the structure of the kernel which may permit the obtention of a corn flour as similar as possible in characteristics to those observed in the dough obtained with the traditional nixtamalization process.

As clearly illustrated in the single FIGURE of the drawings, a mass of corn kernels 1 is fed to a cleaning and washing station 2, wherein the whole corn kernels are cleaned and washed through the use of any mechanical, pneumatic or electrostatic system in order to remove soil, grain dust, corn cob fragments, foreign seeds, iron particles, fibers and the like.

The washed and cleaned corn kernels are thereafter subjected to a conditioning operation in station 3, wherein the corn kernels are admixed with water in a proportion of 1:1.5–2.0 and boiled for a period of about 5 minutes in order to humidify and hydrate the grain, until a moisture content of from about 23 to 25% is obtained in the whole corn kernels. Said conditioning operation may also be effected by the use of steam chambers or autoclaves, wherein the kernels are treated for 5 minutes or until said moisture content is obtained.

The spent water from the conditioning step is drained and the hydrated kernels are subjected to a crushing operation through the use of a disk mill 4 having a disk aperture of about 2 millimeters to thereby produce a corn meal having a partially hydrated endosperm and germ fraction, as well as a softened hull fraction.

The corn meal thus obtained is passed to a screening station 5, wherein it is passed through a sieve having a screen mesh aperture number 16 (1 millimeter) whereby to obtain a fine endosperm fraction passing through the 16 mesh screen (fraction $-16$) which is stored in a suitable storage area 6, and a coarse fraction containing all of the hull, as well as the endosperm $+16$ fraction. This coarse fraction is thereafter passed to a pneumatic sifter 7, wherein the said fraction is furtherly classified by separating a coarse endosperm $+16$ fraction 8 and a hull fraction including fines and constituting a $-8+16$ fraction which is thereafter fed to a second sieve 9 having two screens of 8 and 16 mesh (U.S. standard mesh), whereby three different fractions are obtained, namely, a fine endosperm $-16$ fraction 10, a coarse hull fraction passing the screen having mesh 8, which is directly fed to the nixtamalization step 13 as will be described hereinbelow, and a third intermediate fraction containing hull and endosperm and constituting a $-8+16$ fraction, which is thereafter transferred to a second sifter 11 wherein two fractions are obtained, namely, a coarse $-8+16$ endosperm fraction 12 and a hull $-8+16$ fraction which is thereafter fed to the nixtamalization station 13, together with the coarse hull $+8$ fraction directly obtained from the sieve 9. The $+8$ fraction obtained from sieve 9 and the light fraction obtained from sifter 11 are mixed, as mentioned above to be fed to the nixtamalization station, constituting the hull fraction which represents a 10% of the total weight of the corn kernels initially fed to the process. The $-16$ fraction from the sieve and the heavy fraction of the sifters 9 and 11 are also mixed to obtain an endosperm-germ fraction representing 90% of the total weight of the corn kernels fed to the process. These series of operations however, may be considerably simplified depending on the efficiency of the sifters and sieves available, such as through the use of sifting tables, density separators, Kice type aspirators, reel sieves, and the like.

The nixtamalization step which is carried out in station 13 and which is the gist of the process of the present invention, is carried out with only the hull fraction described above, and is effected under alkaline conditions at temperatures of from 85° to 121° C. and for a period of from 10 to 30 minutes, within a system having a stirring apparatus. The alkali (calcium oxide) concentration may be of from 0.4 to 1.0% based on the whole corn kernels or from 4 to 10% based on the hull. During this operation, certain changes are produced, namely, solubilization of the hemicellulose which causes the partial desintegration of the said cellulose into fibriles, said fibriles having a great importance for the rheologic characteristics of the dough and tortillas obtained from the corn flour produced by the process of the present invention.

The initial pH of the nixtamalization solution is of from 12.0 to 12.5, and tends to decrease at the end of the treatment down to levels of from 8.5 to 11.5, depending on the initial lime concentration used.

After completing the nixtamalization operation at the station 13, the treated material is drained, whereby the spent alkaline liquor or "nejayote" is removed either for further utilization or discarding at station 15, whereas the nixtamalized corn hull fraction is subjected to a washing operation at the washing station 14, which washing operation may comprise one or more steps using fresh water in eash step and under stirring. The preferred ratio by weight of hull to water is of about 1:3.5 in each washing step. Between each washing stage, the resulting water is drained with the aid of a slight expression to mechanically remove as much water as possible. It has been proven that the washing step is essential to the process of the present invention, inasmuch as otherwise the products resulting from the nixtamalization are of a dark color and a slightly bitter flavor.

The nixtamalized, drained and washed hull fraction is thereafter admixed with the endosperm/germ fraction obtained on steps 6, 8, 10 and 12, such that the material obtained after mixing be strictly homogeneous and with a moisture of from 30 to 35% by weight. During the mixing operation a slight thermal treatment at a temperature of from 70° to 75° C. and for periods of time of from 2 to 5 minutes may be applied on the product by means of steam, hot air or any other similar heating means. The admixing of the treated hull fraction and the untreated endosperm/germ fraction is carried out in a mixer 17 from which the mixture is passed to the mill 18, which is preferably a high speed hammer mill and the grinding operation is carried out as a humid grinding operation, with a moisture content of the material of from 30 to 35%, thus producing an absolute desintegration of the hull and the obtention of a nixtamalized whole corn flour having a suitable grain size 80% of which passes a U.S. mesh 60 screen. The grinding operation may be carried out by means of a series of hammer mills 18 and 19 and preferably passing the material through a sieve having a screen of mesh number 30 U.S. standard to obtain a homogeneous fine corn flour.

Finally, the moist corn flour thus obtained is subjected to a drying operation in a drier 20, until the moisture content thereof is of from 8 to 10%, preferably by means of driers with pneumatic conveyance at a relatively low temperature of from about 60° to about 80° C. The product obtained from the drying operation is taken to a storage 21 and comprises a corn flour having excellent organoleptic and rheological characteristics in view of the fact that only the hull portion of the corn kernel was subjected to the nixtamalization operation.

The corn flour obtained by the process of the present invention, as explained above, has the excellent properties which render the same suitable for producing a masa dough for the manufacture of tortillas, which is comparable to the masa dough produced by the traditional nixtamalization process, in view of the fact that, while it nevertheless contains an accelerated nixtamalization step, said accelerated nixtamalization step is carried out only with the hull fraction of the corn kernels, whereas the endosperm and germ fraction thereof is not treated with the alkaline liquor, thus avoiding undue gelatinization of the starch contained in the endosperm and possible damage in the rheological characteristics of the products ultimately manufactured. The corn flour produced by the process of this invention, therefore, contains most of the starch in a hydrated but not gelatinized form, whereby the water content of the masa dough produced therefrom, when formed into disks or tortillas and cooked, contains a relatively large amount of water of hydration in the starch, which renders the end product or tortillas very soft, flexible and formable, with excellent folding characteristics, which is not the case of the traditionally manufactured corn flours, by processes which entail the utilization of an accelerated nixtamalization step to which the whole corn kernels are subjected, thus suffering of undue gelatinization of the starch and of undue loss of fiber.

On the other hand, the fractionation of the different constituents of the corn kernel in order to treat only the hull portion thereof, keeps the consumption of alkali relatively low, whereby the process is excellent costwise and the product produced thereby may advantageously compete with the traditionally produced masa dough from the traditional slow nixtamalization process which is the only one that is able to produce soft, flexible and highly plastic tortilla products after cooking.

Although in the above certain specific embodiments of the present invention have been shown and described, it is to be understood that many modifications thereof are possible. The present invention, therefore, is not to be restricted except insofar as is necessitated by the prior art and by the spirit of the appended claims.

What is claimed is:

1. A process for producing nixtamalized corn flour comprising the steps of: cleaning whole corn kernels, conditioning the cleaned kernels by incorporating moisture therein sufficient to soften the hulls and to hydrate the starch contained in the endosperm, crushing the thus conditioned kernels to form a particular corn material, classifying the particulate corn material to produce a hull fraction isolated from a fraction comprising endosperm and germ, subjecting only the said hull fraction to a nixtamalization step, draining spent nixtamalization liquor, washing the nixtamalized hull fraction, mixing said nixtamalized hull fraction with the untreated fraction comprising endosperm and germ, grinding the mixture, and drying the ground mixture to obtain a nixtamalized corn flour.

2. A process according to claim 1 wherein said conditioning of the cleaned corn kernels is carried out by subjecting said cleaned corn kernels to boiling in an aqueous medium for a period of time of about 5 minutes until the whole kernels acquire a moisture of from 23 to 25% by weight.

3. A process according to claim 1 wherein said conditioning of the cleaned corn kernels is carried out by subjecting the whole cleaned corn kernels to a steam atmosphere for a period of time of about 5 minutes until the corn kernels acquire a moisture of from 23 to 25% by weight.

4. A process according to claim 1 wherein said crushing of the conditioned kernels to form a particulate corn material is carried out by means of a disk mill having an aperture of about 2 millimeters between grinding disk surfaces.

5. A process according to claim 4 wherein said particulate material is classified to produce a hull fraction isolated from the fraction comprising endosperm and germ, by means of the steps of screening the said particulate material through a fine screen in order to remove a fine fraction comprising endosperm and germ, which passes through the screen and a coarse fraction which remains on the screen and which comprises the entire amount of hull contained in the kernels, as well as a coarse endosperm fraction, then sifting the coarse fraction for removing the coarse endosperm fraction from the hull; then again screening the hull fraction containing fines, in order to obtain three different fractions, through a pair of screens, one of which is a fine screen and the other of which is a coarse screen, whereby there are obtained a fine endosperm fraction which passes through the fine screen, a hull fraction which remains on the coarse screen and an intermediate fraction which passes through the coarse screen but which does not pass through the fine screen and containing a mixture of intermediate size hull and endosperm particles, thereafter sifting the intermediate fraction obtained from the above screening operation, in order to remove an intermediate endosperm fraction and an intermediate hull fraction, and thereafter admixing the intermediate hull fraction obtained from the above sifting operation with the coarse hull fraction obtained from the last mentioned screening operation, for producing a hull fraction to be subject to the nixtamalization operation.

6. A process according to claim 5 wherein the nixtamalization of the hull fraction of the corn kernels is carried out by subjecting said hull fraction to an alkaline treatment at a temperature of from 85° to 121° C. for a period of from about 10 to 30 minutes under stirring, in the presence of an aqueous alkali solution having a concentration of from about 0.4 to about 1% by weight of alkali based on the whole corn kernels, equivalent to from about 4 to about 10% by weight based on the hull fraction of the corn kernels.

7. A process according to claim 6 wherein said alkali is calcium hydroxide.

8. A process according to claim 7 wherein the pH of said alkaline nixtamalization solution is of from 12.0 to 10.5 initially, and of from 11.5 to 8.5 at the end of the nixtamalization step.

9. A process according to claim 8 wherein said nixtamalized hull fraction is washed by means of a plurality of washing stages, in each one of which the nixtamalized hull fraction is washed by means of water in a ratio of from 1:3.5 of hull fraction to water in each washing stage and aiding the draining of the wash water by means of an expression of the hull fraction.

10. A process according to claim 9 wherein the mixing of said hull fraction with the untreated fraction comprising endosperm and germ is carried out until homogeneity of the mixture is obtained, and a moisture content of from 30 to 35% by weight is achieved.

11. A process according to claim 10 wherein said mixing is carried out under heating at a temperature of from 70° to 75° C. for a period of from 2 to 5 minutes.

12. A process according to claim 11 wherein said grinding of the mixture of nixtamalized hull fraction and untreated fraction comprising endosperm and germ is carried out through a tandem of high speed hammer mills and thereafter the product is screened through a sieve having a mesh 30 screen (U.S. standard mesh).

13. A process according to claim 12 wherein the drying of the ground mixture to obtain a nixtamalized corn flour is carried out until the moisture content thereof is of from about 8 to about 10%.

* * * * *